United States Patent Office 3,585,176
Patented June 15, 1971

3,585,176
PROCESS FOR THE PEROXIDIC HOMOPOLYMERIZATION OR COPOLYMERIZATION OF VINYL MONOMERS
Hans G. Gerritsen, Deventer, and Hans Jaspers, Diepenveen, Netherlands, assignors to Koninklijke Industrieele Maatschappij Noury & Van Der Lande N.V., Brink, Deventer, Netherlands
No Drawing. Filed Aug. 19, 1968, Ser. No. 753,778
Claims priority, application Netherlands, Aug. 29, 1967, 6711825
Int. Cl. C08f 3/68, 7/04, 15/22
U.S. Cl. 260—85.5                           7 Claims

ABSTRACT OF THE DISCLOSURE

At least one vinyl monomer is subjected to peroxidic homopolymerization or copolymerization, in two heating steps, with the aid of a bifunctional diperester having the general formula:

$$(CH_3)_3C-O-O-\underset{O}{\overset{O}{\underset{\|}{C}}}-\underset{R''}{\overset{R'}{\underset{|}{C}}}-X-\underset{O}{\overset{O}{\underset{\|}{C}}}-O-O-C(CH_3)_3$$

in which $R'=H$, $CH_3$— or $C_2H_5$—;
$R''=CH_3$— or $C_2H_5$—; and
$X=-CH_2-$ or $-A-CH_2-$, in which —A— represents a branched or unbranched alkylene group containing 1–7 C-atoms.

Preferable bifunctional peresters for the purpose are:

di-tertiary butylperoxy-alpha-methyl-succinate,
di-tertiary butylperoxy-alpha-methyl glutarate,
di-tertiary butylperoxy alpha, gamma-dimethyl adipate,
di-tertiary butylperoxy-trimethyl adipate, and
di-tertiary butylperoxy-alpha, gamma, gamma-trimethyl adipate.

---

The present invention relates to a process for the peroxidic homopolymerization or copolymerization in two heating steps of a mixture comprising at least one vinyl monomer and a bifunctional diperester. It also relates to homopolymers or copolymers when prepared by the process according to the invention.

The term "bifunctional diperesters" is to be understood to mean diperesters containing two peroxy groups of different reactivities, as a result of which these peresters may decompose into free radicals at two different temperatures.

It is well known in the art that the homopolymerization or copolymerization of vinyl monomers may be initiated with the aid of free radicals generated by organic peroxides. The range of temperatures over which this polymerization takes place depends upon the monomers to be polymerized and upon the particular peroxidic initiator employed. Using tertiary butyl perbenzoate as an initiator, the homopolymerization of styrene takes place at a temperature ranging from 100° to 120° C. However, when use is made of benzoyl peroxide, this polymerization may take place at a lower temperature, viz. at a temperature ranging from 75° to 95° C.

The use of a single initiator applicable within a certain range of temperature gives rise to difficulties in practice. The above-mentioned use of benzoyl peroxide has the disadvantage that the resultant polystyrene contains 0.5–2% by weight of residual monomeric styrene, which is detrimental to the mechanical properties of the polymer product.

In order to obtain as complete a polymerization of the vinyl monomer as possible, in practice a combination of peroxides is preferably used, thus allowing the polymerization to take place in two temperature steps. For instance, it has already been proposed to polymerize styrene by heating it at a temperature ranging from 75° to 95° C. and subsequently at a temperature ranging from 100° to 120° C. in the presence of a combination of peroxides, e.g. benzoyl peroxide and tertiary butyl perbenzoate or benzoyl peroxide and di-tertiary butyl di-perphthalate.

In Belgian patent specification No. 668,325, there is described a process for the suspension polymerization of styrene in two heating steps with the aid of bifunctional diperesters having the general formula:

$$R'-O-O-\underset{O}{\overset{\|}{C}}-(CH_2)_4-\underset{O}{\overset{\|}{C}}-O-O-R''$$

in which R' and R'' represent the same or different alkyl or aryl groups. It is there suggested that the aforesaid diperesters should contain different alkyl or aryl peroxy groups as otherwise the bifunctional character of the diperesters becomes lost.

In U.S. Pat. No. 2,698,863, diperesters having two like alkyl peroxy groups, which may be considered as derived from dicarboxylic acids containing a $$-\underset{\|}{\overset{O}{C}}-R$$

substituent in the alpha-position, are recommended for the polymerization of vinyl monomers at a temperature not exceeding 50° C. These diperesters, however, are not suitable for the polymerization of vinyl monomers in two heating steps.

It has now been discovered, in accordance with the present invention, that di-tertiary butyl peresters having the general formula:

$$(CH_3)_3C-O-O-\underset{O}{\overset{O}{\underset{\|}{C}}}-\underset{R''}{\overset{R'}{\underset{|}{C}}}-X-\underset{O}{\overset{O}{\underset{\|}{C}}}-O-O-C(CH_3)_3$$

in which $R'=H$, $CH_3$— or $C_2H_5$—;
$R''=CH_3$— or $C_2H_5$—; and
$X=-CH_2-$ or $-A-CH_2-$, in which —A— represents a branched or unbranched alkylene group containing 1–7 C-atoms, are excellently suitable for use as bifunctional initiators in the two-step homopolymerization or copolymerization of vinyl monomers.

The peresters to be used as initiators according to the present invention have the definite advantage over the peresters mentioned in the aforesaid Belgian patent specification that they may be prepared in a simple way. Thus, an acid dichloride having the general formula:

$$Cl-\underset{O}{\overset{O}{\underset{\|}{C}}}-\underset{R''}{\overset{R'}{\underset{|}{C}}}-X-\underset{O}{\overset{O}{\underset{\|}{C}}}-Cl$$

in which R', R'' and X have the meanings as above, is reacted with the sodium salt of tertiary butyl hydroperoxide dissolved in water, in a molar ratio of 1:2.5. By adding a suitable organic solvent, such as benzene, the perester formed is extracted from the aqueous layer and subsequently recovered from the extraction agent, for instance by distilling off the organic solvent.

Vinyl monomers which may be homopolymerized or copolymerized in two heating steps, by the use of these bifunctional peresters, include ethylene, propylene, vinyl chloride, vinylidene chloride, vinyl acetate, esters of acrylic acid and methacrylic acid such as methyl and ethyl methacrylate, acrylonitrile, methacrylonitrile, styrene, and also nuclear-substituted derivatives thereof such as mono-, di- and tri-chloro-styrene, para-methyl styrene, 3,4-dimethyl-styrene and divinyl benzene.

The polymerization of these vinyl monomers with the aid of the bifunctional peresters according to the present invention may be carried out as a suspension and block polymerization.

The polymerization is carried out at two temperatures ranging from 40° to 90° C. and from 90° to 120° C., respectively. The difference in temperatures between the first and second step is preferably at least 20 centigrade degrees.

The quantity of peresters to be used depends upon the vinyl monomer or mixture of monomers to be polymerized. Generally, it will amount to 0.05–1% by weight calculated on the monomer or monomeric mixture undergoing polymerization.

Preferable peresters to be used in carrying out the process according to the present invention are:

di-tertiary butylperoxy-alpha-methyl-succinate,
di-tertiary butylperoxy-alpha-methyl glutarate,
di-tertiary butylperoxy-alpha, gamma-dimethyl adipate,
di-tertiary butylperoxy-trimethyl adipate; and
di-tertiary butylperoxy-alpha, gamma, gamma-trimethyl adipate.

By suitably varying the temperatures and times, either the average molecular weight of the finished polymer may be controlled or the residual monomeric content contained therein may be reduced at will. The optimum time depends on the particular polymer to be prepared and the particular peroxide employed for its preparation. In the temperature range of from 40° to 90° C. a time of from 3 to 10 hours is generally suitable and in the temperature range of from 90° to 120° C. a time of from 1 to 4 hours is generally suitable.

In order that the present invention may be still more readily understood, the following detailed working examples are given. Where in these examples reference is made to the average molecular weight ($\overline{M}_v$) of the finished polymer, this was calculated from the intrinsic viscosity with the aid of the formula of J. W. Breitenbach (Montasheft für Chemie 81 (1950) 455–7). The intrinsic viscosity was derived from viscosity-measurements of diluted solutions of polymer in toluene at a temperature of 25° C. The concentration of the polymer in the solutions varies in the range of from 200 to 600 mg./100 cc. toluene.

EXAMPLE 1

Polymerizable mixtures of the compositions given in Table 1 were polymerized with vigorous stirring at a temperature of 90° C. for 10 hours. Subsequently the temperature was adjusted to 115° C. and then the polymerization was continued at this higher temperature for 4 hours.

The polymers obtained were filtered and dried and then their residual monomer content was determined.

The results obtained are given in the following Table 1:

TABLE 1

| Composition: | Parts by weight | | |
|---|---|---|---|
| Styrene | 100 | 100 | 100 |
| Water | 300 | 300 | 300 |
| Polyvinyl alcohol | 0.30 | 0.30 | 0.30 |
| di-tert.Butylperoxy-alpha-methylsuccinate | 0.20 | | |
| di-tert.Butylperoxy-alpha-methyl glutarate | | 0.20 | |
| di-tert.Butylperoxy-alpha,gamma-dimethyl adipate | | | 0.20 |
| Residual styrene content in percent | 0.05 | <0.05 | <0.05 |

EXAMPLE 2

A polymerizable mixture of the following composition:

| | Parts by weight |
|---|---|
| Methyl methacrylate | 122.5 |
| Water | 300 |
| Polyvinyl alcohol | 0.30 |
| di-tert.-Butylperoxy-alpha, alpha-gamma-trimethyl adipate | 0.38 | was polymerized with vigorous stirring at a temperature of 50° C. for 6 hours. Subsequently the temperature was adjusted to 90° C. and then the polymerization was continued at this higher temperature for 3 hours.

The polymer obtained was filtered and dried. The residual monomer content was 0.5%.

EXAMPLE 3

A polymerizable mixture of the following composition:

| | Parts by weight |
|---|---|
| Acrylonitrile | 28 |
| Styrene | 72 |
| Water | 300 |
| Polyvinyl alcohol | 0.30 |
| di-tert.butylperoxy-alpha, gamma-dimethyl adipate | 0.26 | was polymerized with vigorous stirring at a temperature of 80° C. for 4 hours. Subsequently the temperature was adjusted to 100° C. and then the polymerization was continued at this higher temperature for 3 hours.

The polymer obtained was filtered and dried. The residual monomer content was 0.2%.

EXAMPLE 4

Polymerizable mixtures of the compositions given below in Table 2 were polymerized with vigorous stirring at a temperature of 90° C. for 7 hours. Subsequently the temperature was adjusted to 110° C. and then the polymerization was continued at this higher temperature for 3 hours.

The quantities of peroxide employed were such that the respective mixtures contained equal quantities of active oxygen.

On completion of the polymerization, the degree of conversion was determined, the intrinsic viscosity [$\eta$] of the finished polymers was measured, and the average molecular weight $\overline{M}_v$ was calculated.

The results obtained are tabulated below:

TABLE 2

| | Parts by weight | | | | | |
|---|---|---|---|---|---|---|
| Composition: | | | | | | |
| Styrene | 100 | 100 | 100 | 100 | 100 | 100 |
| Water | 300 | 300 | 300 | 300 | 300 | 300 |
| Polyvinyl alcohol | 0.30 | 0.30 | 0.30 | 0.30 | 0.30 | 0.30 |
| di-tert.Butylperoxy-alpha-methyl-succinate | 0.14 | | | | | |
| ditert.Butylperoxy-alpha, gamma-dimethyl adipate | | 0.16 | | | | |
| Mixture 1:1 of ditert.butylperoxy-alpha, alpha, gamma-trimethyl adipate plus di-tert.butylperoxy-alpha,gamma, gamma-trimethyl adipate | | | 0.18 | | | |
| di-tert.Butylperoxy succinate [1] | | | | 0.13 | | |
| tert.Butylperacetate [1] | | | | | 0.13 | |
| Benzoyl peroxide [1] plus tert.butylperbenzoate | | | | | | 0.18+0.05 |
| Conversion in percent | 98.6 | 99.3 | 99.8 | 90.0 | 89.0 | 99.8 |
| [$\eta$] dl./grams | 1.410 | 1.410 | 1.350 | 1.080 | 1.090 | 1.11 |
| $\overline{M}_v$ | 248,000 | 248,000 | 235,000 | 180,000 | 181,000 | 185,000 |

[1] Reference peroxides.

This invention is not limited to the detailed working examples given above, as variations are possible within the scope of the appended claims.

What is claimed is:

1. A process for the homopolymerization or copolymerization of vinyl compounds comprising polymerizing a vinyl compound or mixture of vinyl compounds in two heating steps, the difference in temperatures between the two steps being at least about 20° C., in the presence of a bifunctional di-tert-butylperester of the formula:

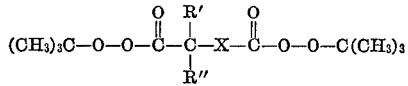

wherein

R' is H, CH$_3$— or C$_2$H$_5$—;
R" is CH$_3$—or C$_2$H$_5$—; and
X is —CH$_2$— or —A—CH$_2$— in which —A— represents a branched or unbranched alkylene group containing 1–7 C-atoms said perester acting as a catalyst, being present in a quantity of about 0.05–1% by weight based on the said vinyl compound or mixture of vinyl compounds.

2. A process as defined in claim 1, wherein the bifunctional di-tert.-perester is di-tertiary butylperoxyalpha-methyl-succinate.

3. A process as defined in claim 1, wherein the bifunctional di-tert.-perester is di-tertiary butylperoxy-alpha-methyl glutarate.

4. A process as defined in claim 1, wherein the bifunctional di-tert.-perester is di-tertiary butylperoxy-alpha, gamma-dimethyl adipate.

5. A process as defined in claim 1, wherein the bifunctional di-tert.-perester is di-tertiary butylperoxytrimethyl adipate.

6. A process as defined in claim 1, wherein the bifunctional di-tert.-perester is di-tertiary butylperoxyalpha, gamma, gamma-trimethyl adipate.

7. A process as defined in claim 1, wherein the polymerization is carried out at a temperature ranging from about 40° to 90° C. and thereafter from about 90° to 120° C.

References Cited

UNITED STATES PATENTS 2,524,536  10/1950  Nordlander et al. _____ 260—
 Peroxide Digest
3,341,507  9/1967  Guillet et al. _____ 260—92.8

HARRY WONG, JR., Primary Examiner

U.S. Cl. X.R.

260—88.7, 89.1, 89.5, 91.5, 92.1, 92.8, 93.5, 93.7, 94.9, 502, 610, 878, 881, 884, 885, 886